(12) United States Patent
Kady

(10) Patent No.: US 6,439,152 B1
(45) Date of Patent: Aug. 27, 2002

(54) DEVICE FOR MARKING THE PATH ALONG THE GROUND OF A ROLLING WHEEL

(76) Inventor: Richard J. Kady, 30 Holman St., Shrewsbury, MA (US) 01545

( * ) Notice: Subject to any disclaimer, the term of this patent is extended or adjusted under 35 U.S.C. 154(b) by 0 days.

(21) Appl. No.: 09/523,433

(22) Filed: Mar. 10, 2000

Related U.S. Application Data

(60) Provisional application No. 60/152,100, filed on Sep. 2, 1999.

(51) Int. Cl.[7] .............................. G08B 1/00; B41G 3/00; B43L 13/00
(52) U.S. Cl. ......................... 116/211; 116/209; 33/36; 33/39.1; 222/171; 222/611.1
(58) Field of Search ................................. 116/200, 201, 116/209, 211; 33/36, 37, 38, 39.1; 222/167, 169, 171, 611.1

(56) References Cited

U.S. PATENT DOCUMENTS

| | | | | |
|---|---|---|---|---|
| 986,018 A | * | 3/1911 | Libner | 222/169 |
| 3,079,049 A | * | 2/1963 | Barnhard | 222/169 |
| 3,197,078 A | * | 7/1965 | Kuperschmid | 222/169 |
| 3,412,905 A | * | 11/1968 | Eichholz | 222/169 |
| 4,273,262 A | * | 6/1981 | Hanson | 222/169 |
| 4,798,707 A | * | 1/1989 | Thomas et al. | 137/268 |

* cited by examiner

*Primary Examiner*—Diego Gutierrez
(74) *Attorney, Agent, or Firm*—Mirick, O'Connell, DeMallie & Lougee, LLP

(57) ABSTRACT

Disclosed is a device for marking the path along the ground of a rolling wheel, comprising: a container having a perimeter, and a single opening along the perimeter for dispensing a marking substance contained within the container, and a sliding gate covering the opening, the gate slidable from a closed position in which it fully covers the opening, to open positions wherein progressively more of the opening is exposed, to adjust the delivery of the marking substance through the opening. The device is mounted to the outside of the wheel so that it rotates with the wheel, the container thereby dispensing the marking substance by gravity when the container opening is rotated by the wheel rotation to a position in which the substance can fall from the container.

8 Claims, 4 Drawing Sheets

DEVICE FOR MARKING THE PATH ALONG THE GROUND OF A ROLLING WHEEL

This application claims the benefit of U.S. Provisional Application No. 60/152,100, filed Sep. 02, 1999.

FIELD OF THE INVENTION

This invention relates to a container that holds a marking substance, and is mounted to the wheel of a lawn or farm spreading device, to mark the path of the device across the ground.

BACKGROUND OF THE INVENTION

When fertilizing or otherwise treating a field or lawn, it is desirable to fully cover the area, without skipping portions, or unduly overlapping portions. However, most spreaders have no means of marking the path of the spreader, which leaves the decision largely up to estimation or guesswork. Thus, there is the need to mark the path of a rolling wheel as it moves across the ground.

SUMMARY OF THE INVENTION

This invention contemplates a device which is attachable to the wheel or wheels of a rolling device such as a fertilizer, spreader, or other lawn, garden, or farm rolling device, to mark the path of the wheel(s). This helps to prevent harmful overlap, or missed strips, when the rolling device is used for its intended purpose. Since the device is easily mounted to a wheel, virtually any such rolling device can be retrofitted with the inventive device.

The device is a container (of virtually any shape) for containing a marking substance, preferably lime, which would be very visible on lawns and other earth surfaces. The container has an opening for letting the marking substance out of the container. Preferably, the opening is made adjustable in size, for example with a sliding gate covering the opening. The device is preferably mounted to the outside of a wheel by a convenient mounting means, preferably one or more Velcro straps fixed or coupled to the container, and passed partially around the wheel. Other mounting means could be used, for example elastic straps, bolts, or a bracket (possibly a two piece bracket, so that the device can be easily removed from the wheel).

In use, the container turns with the wheel, causing the opening to face downward once per revolution. The lime or other marking substance falls out at this time, leaving a series of small blobs or dashes along the wheel path. In order to increase the number of linear feet the device can cover before it must be refilled, the container can have an elongated shape projecting outward from the wheel. Also, one such container could be mounted to each wheel (or more than one, if the wheels are large), with only one opened at a time.

Description of the Preferred Embodiments

This invention may be accomplished in a device for marking the path along the ground of a rolling wheel comprising: a container having an opening for dispensing a marking substance contained within the container; and means for mounting the container to a wheel, so that it rotates with the wheel, the container dispensing the marking substance by gravity when the container opening is rotated by the wheel rotation to a position in which the substance can fall from the container.

Figure 1:
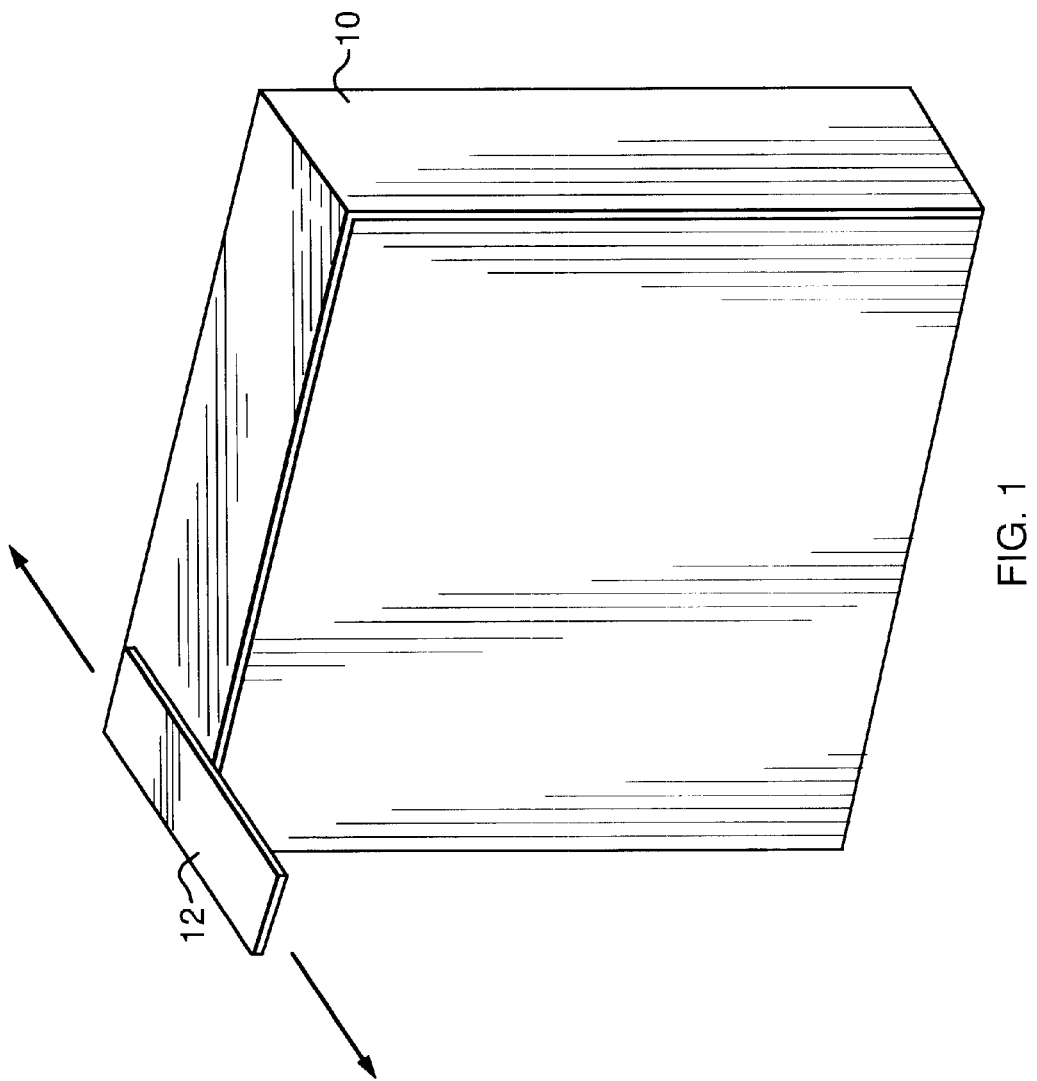
FIG. 1 is an isometric view of a first embodiment of the invention.
Figure 2A:
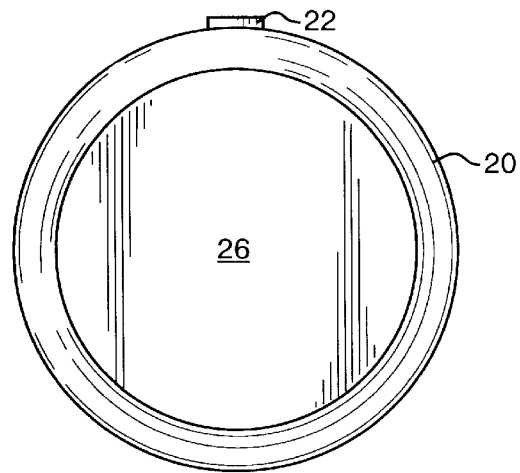
FIG. 2A is a front view of another embodiment of the invention.
Figure 2B:
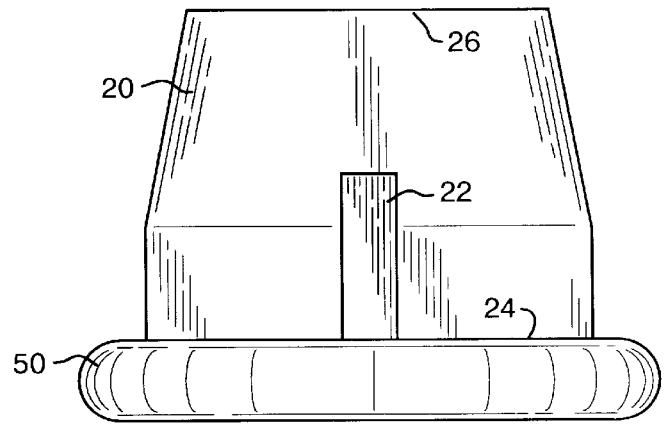
FIG. 2B is a top view of this embodiment, mounted to a wheel.
Figure 2C:
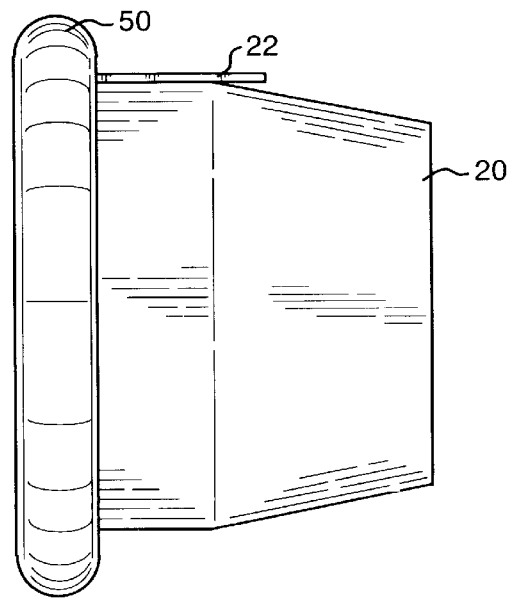
FIG. 2C is a side view of FIG. 2B.

A square container 10 is shown in FIG. 1, and includes a manually operated sliding gate 12 that adjustably closes or partially closes an opening (not shown) through which the marking substance is dispensed as the wheel rotates. A round, projecting container is shown in FIG. 2. Container 20 has round base 24 and an elongated tapered portion projecting therefrom ending in narrow round distal end 26. Container 20 has a manually operated gate 22, and is shown mounted to wheel 50.

The container of the invention has one or more openings through which a marking substance such as lime is dispensed, each time the wheel rotates so that the opening is facing generally down. The opening preferably is adjustable with a device such as the sliding gate shown, or any other structure that accomplishes this function. The container is mounted to a wheel by any appropriate means, such as mechanical fasteners, hook and loop type fastening fabric (one part on the container and one on the wheel), or have permanent mechanical mounting (such as could be accomplished if the wheel and container were molded as a unitary plastic structure).

Figure 3A:
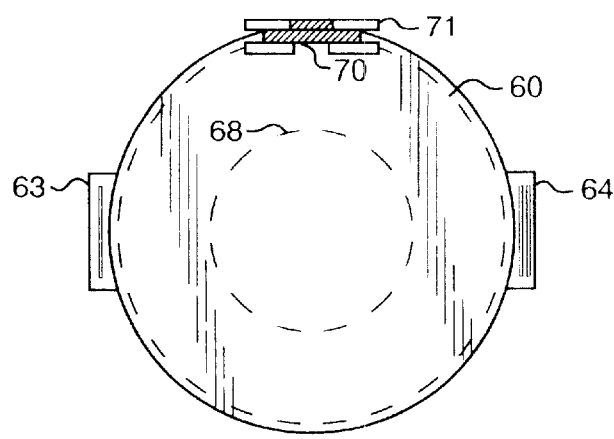
FIGS. 3A–C are front, side and top views of a third embodiment of the invention mounted to a wheel.
Figure 3B:
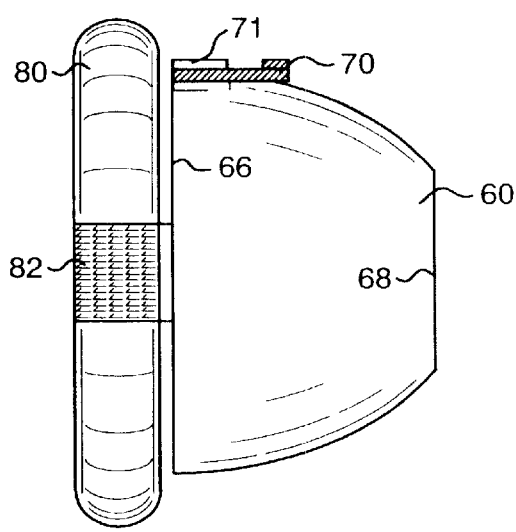
Figure 3C:
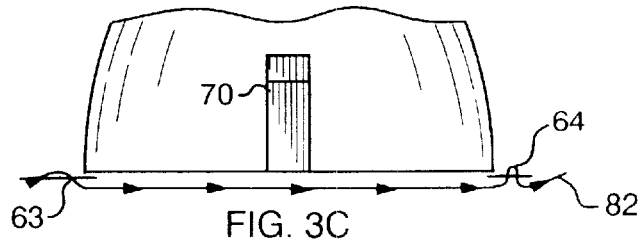
Figure 4:
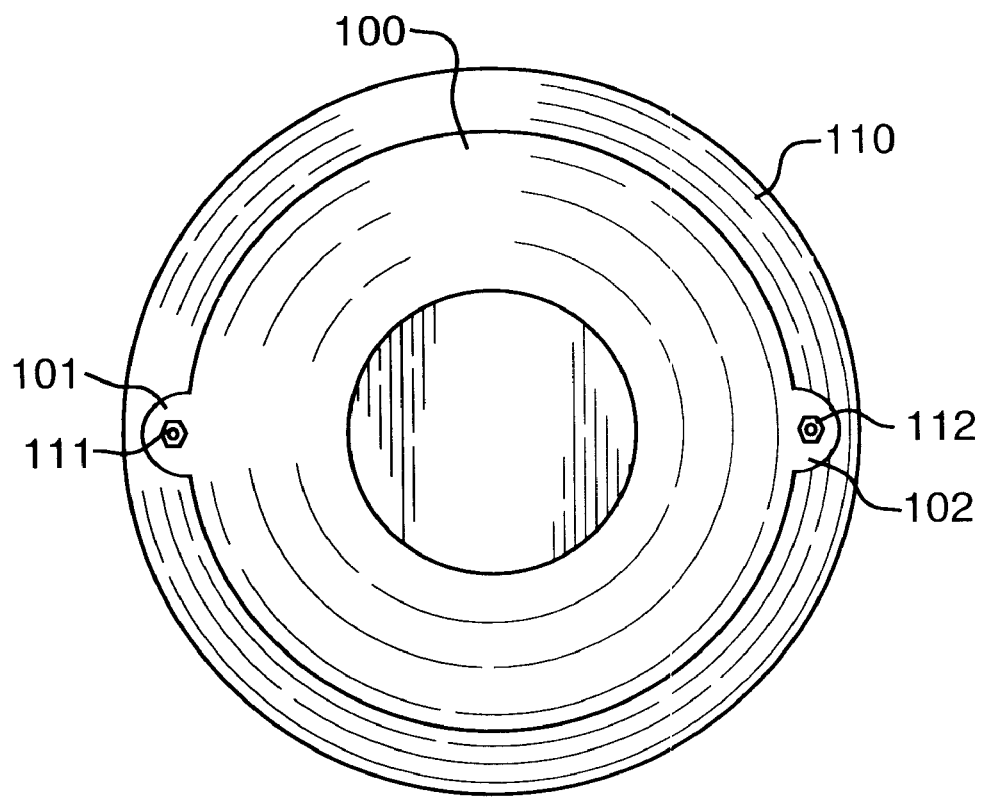
FIG. 4 is a rear view of another means for mounting the container of the invention to a wheel.

In FIG. 3, Velcro strap 82 is passed through slotted connector members 63 and 64 (FIG. 3A), and then partially around wheel 80. Mating Velcro portions may be placed on the tire as shown in FIG. 3B, or elsewhere on the wheel. This removable fastening system allows the device of the invention to be sold as an after market product, and attached to the wheel of any spreader or the like. Base 66 of container 60 then seats against the outside of wheel 80, as it is pulled against the wheel. Container 60 tapers to more narrow distal end 68. The adjustable opening, covered by sliding gate 70 riding in gate support 71, then faces down once per wheel revolution.

The container can have any acceptable shape, three of which are shown. The elongated round shapes of FIGS. 2 and 3 hold more marking substance, and also allow the substance to be more fully dispensed than the square shape of FIG. 1.

Although specific features of this invention are shown in some drawings and not others, this is for convenience only as each feature may be combined with any or all of the other features in accordance with the invention.

Other embodiments will occur to those skilled in the art and are within the following claims:

What is claimed is:
1. A device for marking the path along the ground of a fertilizer spreader having at least one rolling wheel, comprising:
   a container having an outside and a perimeter, and a single relatively large opening along the perimeter for dispensing by gravity a solid marking substance contained within the container;
   a one-piece, flat sliding gate on the outside of the container and covering the opening, the gate slidable from a closed position in which it fully covers the opening, to open positions wherein progressively more of the opening is exposed, to adjust the delivery of the marking substance through the opening;

a gate support in which the gate is received and slides, the gate support affixed to the outside of the container; and means for removably mounting the container to the wheel, so that it rotates with the wheel, the container thereby dispensing the marking substance by gravity when the container opening is rotated by the wheel rotation to a position in which the substance can fall from the container.

2. The device of claim 1, wherein the container is round.

3. The device of claim 2, wherein the container is elongated.

4. The device of claim 3, wherein the container has a round base and an elongated round portion projecting from the base, and tapered to a more narrow diameter at its distal end.

5. The device of claim 1, wherein the means for mounting includes a two part fastener means, a first part coupled to the container, and a second part attached to the wheel.

6. The device of claim 5, wherein the first part and second part comprise the two parts of a two part hook and loop fastener system.

7. The device of claim 5, wherein the second part comprises protrusions on the wheel, and the first part comprises means overlying the protrusions.

8. A device for marking the path along the ground of a fertilizer spreader having at least one rolling wheel, comprising:

a container with a round base and an elongated round portion projecting from the base, and tapered to a more narrow diameter at its distal end, the container base having an outside and a perimeter, and a single relatively large opening along the perimeter for dispensing by gravity a solid marking substance contained within the container;

a one piece, flat sliding gate on the outside of the perimeter of the container and covering the opening, the gate slidable from a closed position in which it fully covers the opening, to open positions wherein progressively more of the opening is exposed, to adjust the delivery of the marking substance through the opening;

a gate support in which the gate is received and slides, the gate support affixed to the outside of the perimeter of the container; and two part hook and loop fastener means for removably mounting the container to the wheel, so that it rotates with the wheel, the container thereby dispensing the marking substance by gravity when the container opening is rotated by the wheel rotation to a position in which the substance can fall from the container.

* * * * *